D. W. SMITH.
Hoisting-Jack.
No. 225,882. Patented Mar. 23, 1880.
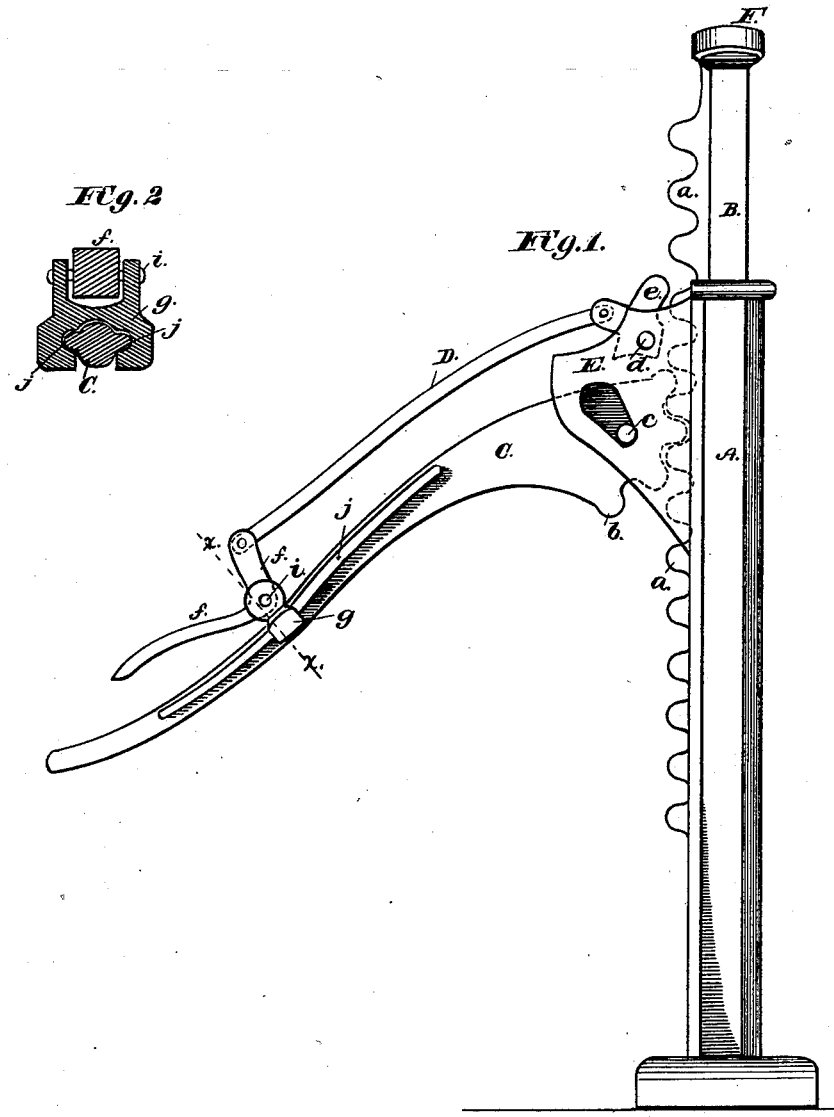
Witnesses:
Chas. M. Peck
P. H. Gunckel
Inventor:
Daniel W. Smith
by Peck & Ritchie
his Attys,

UNITED STATES PATENT OFFICE.

DANIEL W. SMITH, OF TIPPECANOE CITY, OHIO.

HOISTING-JACK.

SPECIFICATION forming part of Letters Patent No. 225,882, dated March 23, 1880.

Application filed January 23, 1880.

*To all whom it may concern:*

Be it known that I, DANIEL W. SMITH, of Tippecanoe City, in the county of Miami and State of Ohio, have invented certain new and useful Improvements in Hoisting-Jacks; and I do hereby declare the following to be a full, clear, and exact description of the same.

My invention relates to an improvement in lifting-jacks for raising heavy bodies; and my improved jack belongs to that class of implements which have a rack lifting-bar recessed in the standard and operated by means of a lever with a cogged segment.

The novelty consists in the construction of the jack and its combination of parts, as will be herewith set forth and specifically claimed.

In the accompanying drawings, Figure 1 is a side elevation of my improved jack. Fig. 2 is an enlarged sectional view through the line $x\ x$ of Fig. 1.

A represents the standard, having a suitable base and with a vertical slot in its front face to receive the lifting-bar. This lifting-bar, as seen, is provided with a head, F, and cogs $a$, forming a rack upon its exposed front edge.

In slotted brackets E, extending from the upper end of the standard and integral therewith, is pivoted or supported upon trunnions, as at $c$, the lever C, which operates the rack-bar B. This lever, of the shape represented, has its ends between the brackets E formed into a cogged segment, which engages with the rack-bar, as shown, and upon each side of this lever C is a rib or flange, $j$. Grasping these flanges and straddling the lever is a bearing-block, $g$, Figs. 1 and 2, in which is pivoted, at $i$, a bell-crank lever or handle, $f$, of the shape shown.

Pivoted between the brackets E, at $d$, is a dog or pawl, which can be made at any time to engage with the rack-bar to hold it up when adjusted or in the act of adjustment. This dog $e$ is connected to the vertical arm of the handle $f$ by a rod or connecting-piece, D, as shown, and thus, by operating the handle $f$, the dog can be made to engage or disengage at the will of the operator.

This construction produces a very efficient and strong jack, and places the pawl in easy control of the operator, who, with one hand, can operate both the lever C and the dog.

By means of the ribs $j$ and sliding self-adjusting block $g$ the lever C can be raised or lowered without affecting the dog or its handle $f$. Also, by this arrangement and construction of the dog, it is made gravitating, and falls by its own weight into engagement with the rack-bar whenever the handle $f$ is released.

To operate the jack it is only necessary to grasp the end of the lever C and handle $f$, when the dog is held back, and upon depressing the lever C the rack-bar B is raised. When the lever is at its lowest point the handle is released, and the dog falls and engages with the rack-bar to prevent its falling. Then the lever C can be raised without releasing the dog, and the operation is repeated.

Having thus fully described my invention, I claim—

The combination, with the standard A and rack-bar B, of the lifting-lever C, provided with ribs $j$ and dog $e$, connected thereto by the bell-crank $f$ and arm D, substantially as and for the purpose specified.

Witness my hand this 13th day of September, A. D. 1879.

DANIEL W. SMITH.

Witnesses:
CHAS. M. PECK,
MCCLELLAN SEILER.